United States Patent [19]

D'Angio et al.

[11] Patent Number: 4,658,399
[45] Date of Patent: Apr. 14, 1987

[54] CIRCUIT ARRANGEMENT DESIGNED TO PICK UP THE ERROR RATE IN NUMERICAL TRANSMISSION SYSTEMS

[75] Inventors: Aldo D'Angio; Claudio Regola, both of Milan, Italy

[73] Assignee: Italtel Societa Italiana Telecomunicazioni spa, Milan, Italy

[21] Appl. No.: 684,007

[22] Filed: Dec. 20, 1984

[30] Foreign Application Priority Data

Dec. 20, 1983 [IT]  Italy .............................. 24267 A/83

[51] Int. Cl.$^4$ ..................... G06F 11/00; H04B 17/00
[52] U.S. Cl. ........................................ 371/5; 371/55; 371/57
[58] Field of Search ................................ 371/5, 55, 57

[56] References Cited

U.S. PATENT DOCUMENTS

| | | | |
|---|---|---|---|
| 3,031,646 | 4/1962 | Reinholtz | 371/55 |
| 4,088,876 | 5/1978 | Rege | 371/57 |
| 4,367,550 | 1/1983 | Douverne | 371/5 |
| 4,393,499 | 7/1983 | Evens | 371/5 |
| 4,402,084 | 8/1983 | Jungmeister | 371/57 X |

FOREIGN PATENT DOCUMENTS

| | | | |
|---|---|---|---|
| 44351 | 3/1982 | Japan | 371/57 |
| 68943 | 4/1982 | Japan | 371/57 |

*Primary Examiner*—Jerry Smith
*Assistant Examiner*—Robert W. Beausoliel, Jr.
*Attorney, Agent, or Firm*—Karl F. Ross; Herbert Dubno

[57] ABSTRACT

A circuit arrangement for detecting the error rate (BER) in numerical transmission systems which use a line code of the 1B/2B type. The circuit arrangement includes the presence of means (MS) to output respectively a first and a second bit stream (A and B) obtained by serializing respectively the first and the second bits of the words making up the input stream. The streams (A and B) are input respectively into the first and second means for detecting errors (PRE and SRE) designed to activate their own outputs when they detect the presence of pairs of bits that are respectively "1—1" and "0—0". Furthermore, it includes the presence of error-totalling means (TE) connected to the outputs of the first and second means for detecting errors.

5 Claims, 2 Drawing Figures

CIRCUIT ARRANGEMENT DESIGNED TO PICK UP THE ERROR RATE IN NUMERICAL TRANSMISSION SYSTEMS

FIELD OF THE INVENTION

The present invention relates to a circuit arrangement, for particular application in the receiving station of a numerical transmission system using a line code of the 1B/2B type, designed to pick up the BER (Bit Error Rate).

BACKGROUND OF THE INVENTION

In numerical transmission systems the data binary stream which will be sent to the distant terminal is initially converted into a three level code (AMI, HDB3, etc.) which has the function of introducing polarity variations, whenever bit sequences with the same logical value are present in the binary signal. The data stream, coded on three levels, is usually also inputted into another coding set designed to output the signal that is sent onto the transmission line. As a line code, a 1B/2B type code (eg: MCMI) is usually used, in other words of the type in which each of the symbols of the three level code is converted into a pair of bits.

Further on in the present description, purely as an example, reference will be made to a line terminal which uses the HDB3 code as a three level code, and the MCMI code as a line code. In the MCMI code the symbols are transmitted expressed in the HDB3 code according to the following rules:
the "+1" of the HDB3 code are transmitted as "1+1"
the "−1" of the HDB3 code are transmitted as "0−0"
the "0" of the HDB3 code are transmitted as "0−1"
It can be noticed that the "1−0" configuration is never used in the MCMI code (forbidden configuration), so that it can be used for measuring the errors made during transmission of the information stream.

In fact, there is usually a circuit present in the receiving section of the line terminals which is specifically for measuring the error rate and which provides indications regarding the quality of the transmission as described above.

There are also well known circuits for measuring the error rate which however have the inconvenience of being so designed as to only pick up a fraction of the errors actually made. These circuits operate using the "forbidden word" method If some errors are made in the receiving station during recognition of the logical levels, some of these errors give rise to the forbidden word "1−0". Therefore, the method in question is based on detecting the forbidden configuration and counting of the number of times it is detected in a predetermined interval of time. But it must be kept in mind that the forbidden word can only be generated if the noise present in the line causes a wrong recognition of the second bit of the word "1−1" (code expression of the "+" symbol HDB3) or of the first bit of the word "0−0" (code expression of the "−" symbol HDB3). The forbidden word can never be generated with reference to the configuration "0−1" (code expression of the "0" symbol HDB3), except in the case of two consecutive errors (a condition which can occur only with an extremely low probability rate). Consequently, the forbidden word method makes it possible to pick up only about 27.5% of the effective errors made at the most. However, the detection of errors is only applicable under theoretical conditions, and in practice the percentage of errors that may actually be picked up is much less than that specified above. In fact, 27.5% of errors may be picked up on the condition that the line noise is of a Gaussian type, on the condition that the probabilities for committing errors are the same on the "1" bits as on the "0" bits, and on the condition that the probabilities for committing errors do not depend on the type of sequence that is transmitted on the line in a given instant.

In actual practice, it must however be kept in mind that in fiber optic systems the noise has a different spectrum from Guassian noise and that the noise level is a function of the signal level. Consequently, the signal to noise ratio S/N is worse in the presence of "1" bits, so that the probability of committing errors in the discrimination operation is greater for "1" bits than for "0" bits.

Furthermore, if the transmission medium attenuates the high frequencies more in respect to the low frequencies, then the probability of committing errors during recognition of the "0−1" configuration is all the greater with respect to the "0−0" and "1−1" configurations the more marked is the difference in attenuation described above.

The attenuation difference mentioned above, in actual practice, causes a greater probability of committing errors during recognition of the "0" symbol in HDB3 where, as has already been mentioned, the forbidden word is never generated. Therefore, the number of bit errors which theoretically may be measured with the forbidden word method (about 27.5%), in actual fact is greatly reduced in practice.

All that has been said so far is true when the transmission medium is a fiber optic and the noise is also generated by a photodetector.

OBJECT OF THE INVENTION

The object of the present invention is to provide a circuit designed to measure or pick up the number of bit errors, more or less independently of the aforementioned conditions, and which is at the same time reliable and simple in construction.

SUMMARY OF THE INVENTION

For this purpose, the circuit which is the basis of the present invention operates on the basis of a method which is different to the "forbidden word" method, and from now on will be called the "pair" method.

In particular, the circuit realized according to this invention carries out the separation of the bit stream received into two separate streams, hereinafter referred to as stream A and stream B, by serializing respectively the first bits and the second bits of the words of the MCMI code.

If we recall the rules regulating the conversion from HDB3 into MCMI illustrated above, and also that the HDB3 code introduces an inversion of polarity whenever there are bit sequences with the same logical value present in the binary signal, it may be concluded that, in the absence of errors, it is not possible to have two consecutive "1" bits on stream A and two consecutive "0" bits on stream B.

On the other hand, when errors occur, this condition is violated and "pairs" of "1" bits and of "0" bits are to be found respectively on streams A and B.

The circuit which is the basis of the present invention is designed to pick up (or measure) the presence of the abovementioned pairs and count their number during a predetermined interval of time. It has been found that the circuit according to the invention can pick up a high proportion of the errors committed (about 63%), even when the attenuation difference mentioned above has marked values.

Therefore, the circuit arrangement according to the invention includes the presence in combination of the following characteristic elements:

separation means, designed to receive at its input the signal coded according to the the line code and also designed to output on a first output, and respectively a second output, binary streams obtained by serializing the first bits, and respectively the second bits, of each word of the line code;

first means for detecting bit errors, connected to the first output of the separation means, designed to activate their own output each time they receive at the respective input a pair of bits with a logical value of "one";

second means for detecting bit errors, connected to the second output of the separation means, designed to activate their own output each time they receive in input a pair of bits with a logical value of "nought"; and error totaling means designed to provide indications about the total number of pulses that correspond to the output of the first and second means for detecting errors;

BRIEF DESCRIPTION OF THE DRAWING

Further characteristics of the invention will be made clear by the following description which refers to the accompanying drawing in which.

SPECIFIC DESCRIPTION

Figure 1:
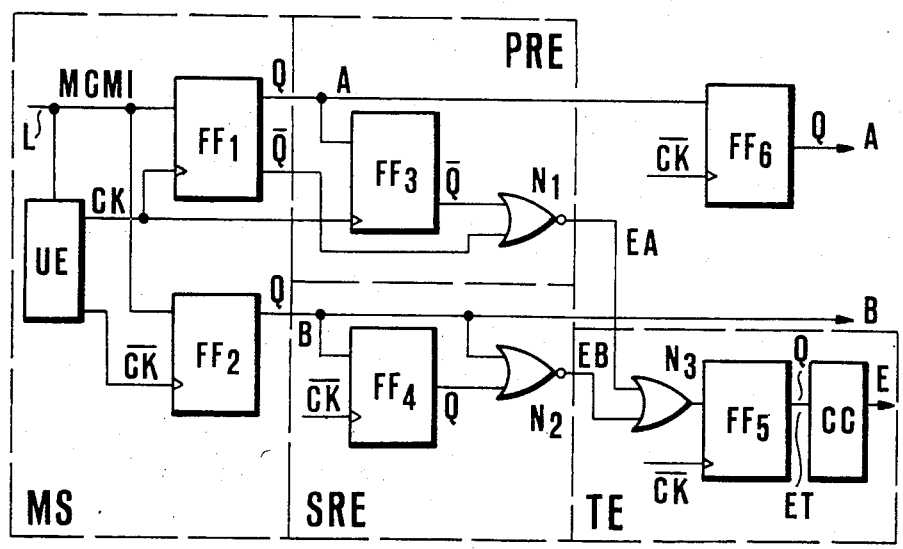
FIG. 1 is a diagram of the circuit arrangement realized according to the present invention.

The circuit arrangement made according to the invention is illustrated in FIG. 1, which will be described with reference to a 34 Mbit/s transmission system. In particular, seeing as the circuit which forms the basis of the present invention may be used in combination with a line code of the 1B/2B type, a bit stream flows onto the transmission line L at a speed of 68 Mbit/s.

Figure 2:
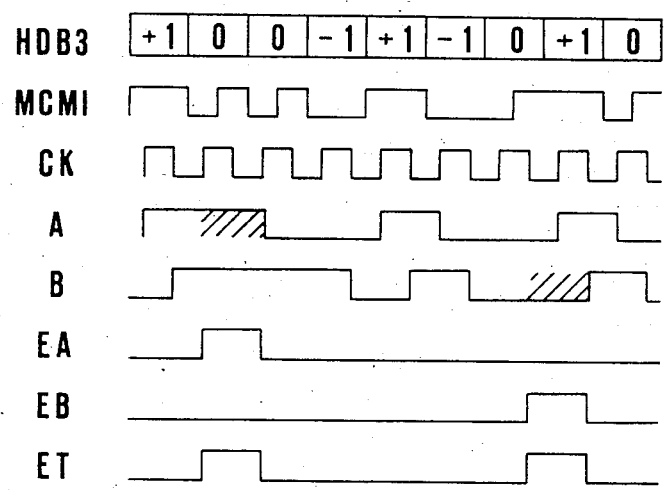
FIG. 2 is a diagram of wave forms relevant to FIG. 1.

In FIG. 2 a sequence of symbols in HDB3 code is illustrated and in the second diagram the translation of said sequence into MCMI code.

Separation means MS are connected to the line L, and said means include an extraction unit UE of the timing pulses, designed to output a clock pulse (see FIG. 2) the frequence of which is half (34 MHz) of the digit frequency of the signal which it receives on its input.

The data stream in MCMI code is also inputted into the data input of a first and a second bistable circuit $FF_1$ and $FF_2$ which receive on their timing inputs the said clock CK and respectively the clock $\overline{CK}$.

A first bit stream corresponds to the output of the $FF_1$ unit (see stream A in FIG. 2), obtained by serializing the first bit of each MCMI word, whilst a second bit stream corrisponds to the output of the $FF_2$ unit (see stream B in FIG. 2) which is the result of the serialization of the second bit of the MCMI words. As was previously specified the two bit streams have the property that in the absence of bit errors there are never two consecutive bits with a logical value "one" present in stream A, while there are never two consecutive bits with a logical value "nought" present in stream B. In the presence of errors this rule is violated and said violations are shown in FIG. 2 with a hatched region.

The circuit arrangement made according to the invention is based on the method of picking up pairs of bits "1—1" in stream A and pairs of bits "0—0" in stream B in as much as the presence of said pairs indicates the presence of errors.

The presence of said pairs is revealed by detecting means of first means for picking up errors PRE, which in a preferential form are implemented by means of bistable circuits and logical circuits, but can be implemented by means of other means such as registers, etc.

In fact, the PRE means can include a D type bistable circuit $FF_3$ which receives on its data input the stream A and on its timing input the clock CK. The inverted output of the $FF_3$ unit reaches a first input of a NOR type logical unit $N_1$ which receives on its second input the inverted output of the $FF_1$ unit. When there are two consecutive "one" bits present in the A stream, the $N_1$ unit activates its own output EA as is illustrated in FIG. 2.

The B bit stream is analyzed by means of a structure that substantially coincides with that described with reference to the A stream. The second detecting means for picking up errors SRE infact include the presence of a D type bistable circuit $FF_4$ which receives on its timing input the said clock $\overline{CK}$. A NOR type logical unit $N_2$ is connected to the output of the $FF_4$ unit and receives on its second input the B stream. When there are two consecutive "nought" bits present in the B stream the $N_2$ unit activates its own output EB as is illustrated in FIG. 2. Error totaling means TE are connected to the outputs of the PRE and SRE means, which in a preferential form are made up of an OR type logical unit $N_3$ the output of which is connected onto the data input of a furher bistable circuit $FF_4$. This latter unit receives on its timing input the clock $\overline{CK}$ and outputs from its own output ET (see FIG. 2) a pulse each time the presence of an error in stream A or stream B is revealed. Counting circuits CC of a known type are connected to the output of the $FF_5$ unit which are designed to total said pulses and displacing the total in the required forms. A further bistable circuit $FF_6$ is illustrated in the FIG. 1 which receives stream A on its data input and the clock $\overline{CK}$ on its timing input. The function of the $FF_6$ unit is to make stream A parallel and synchronous to stream B as is required for the correct operation of the decoding circuits (not illustrated).

It can be proved that the circuit arrangement forming the basis of the present invention has been so designed as to pick up a number of bit errors that, even in particularly severe conditions as far as the attenuation difference described above is concerned, amounts to about 63% of the errors actually made. Therefore, the number of errors that may be measured with the circuit forming the object of the present invention is sensibly higher than the number of errors that may be measured with circuits of known types.

The high number of errors that may be measured with the circuit made according to the invention is possible thanks to the fact that said circuit is not influenced by the type of noise present on the transmission line and is only slightly influenced by the said attenuation difference between high and low frequencies. Furthermore, the said circuit is of simple construction as required by the purpose of the invention.

We claim:

1. A circuit arrangement for measuring an error rate in a numerical transmission system using a 1B/2B line code in which each symbol of an original code is converted into a train of two-bit words including a first bit of one of two binary values and a second bit of one of said two binary values, said circuit arrangement comprising:

separating means having an input receiving said train of two-bit words and first and second outputs, said first output generating a first stream of said first bits in serialized form from said train of two-bit words, said second output generating a second stream of said second bits in serialized form corresponding to said train of two-bit words;

first detecting means connected to said first output and responsive to the appearance of consecutive first bits of one of said binary values for generating an output representing an error count;

second means connected with said second output and responsive to consecutive second bits of the other of said binary values for generating an output representing an error count; and counting means connected to outputs of said first and second means for totaling said counts representing said errors.

2. The circuit arrangement defined in claim 1 wherein said separating means includes a timing pulse extraction unit outputting a clock signal of a frequency which is half of the frequency of said line code; and first and second D-type bistable circuits having data inputs connected to a transmission line carrying said line code and timing inputs connected to said timing pulse extraction unit for receiving respectively said clock pulse and an inverted clock pulse train, each of said bistable circuits being formed with a respective one of said outputs of said separating means.

3. The circuit arrangement defined in claim 2 wherein said first detecting means includes a third D-type bistable circuit having a data input receiving said clock pulses from said timing pulse extraction unit; and a NOR-type logic circuit having a first input receiving an inverted output of said first bistable circuit.

4. The circuit arrangement defined in claim 3 wherein said detecting means includes:

a fourth D-type bistable circuit having a data input connected to said second output and a timing input receiving said inverted clock pulse from said timing pulse extraction unit; and a second NOR-type logic circuit having a first input receiving an output from said second bistable circuit and a second input receiving an output from said fourth bistable circuit.

5. The circuit arrangement defined in claim 4 wherein said counting means includes:

an OR-type logic circuit having inputs connected to said outputs with said first and second means; and a fifth D-type bistable circuit having a data input connected to an output of said OR-type logic circuit and a timing input receiving said inverted clock pulse from said timing pulse extraction unit, a counter being connected to the output of said fifth bistable circuit.

* * * * *